United States Patent [19]
Cahill

[11] Patent Number: 5,287,556
[45] Date of Patent: Feb. 15, 1994

[54] INTERFERENCE REDUCTION USING AN ADAPTIVE RECEIVER FILTER, SIGNAL STRENGTH, AND BER SENSING

[75] Inventor: Stephen V. Cahill, Palatine, Ill.

[73] Assignee: Motorola, Inc., Schaumburg, Ill.

[21] Appl. No.: 590,415

[22] Filed: Sep. 28, 1990

[51] Int. Cl.⁵ .............................................. H04B 1/16
[52] U.S. Cl. .................................. 455/266; 455/307; 455/340
[58] Field of Search ............... 455/200, 226, 266, 295, 455/296, 306, 307, 339, 340, 312, 213; 375/34, 99, 102, 103; 371/5.1, 5.5

[56] References Cited

U.S. PATENT DOCUMENTS

| | | | |
|---|---|---|---|
| 3,462,691 | 8/1969 | McDonald . | |
| 4,132,952 | 1/1979 | Hongu et al. | 325/459 |
| 4,135,158 | 1/1979 | Parmet | 325/317 |
| 4,408,348 | 10/1983 | Theriault | 455/180 |
| 4,459,650 | 1/1985 | Konishi et al. | 455/144 |
| 4,510,624 | 4/1985 | Thompson et al. | 455/223 |
| 4,527,281 | 7/1985 | Imagawa et al. | 455/165 |
| 4,549,312 | 10/1985 | Michaels et al. | 455/307 X |
| 4,573,211 | 2/1986 | Kupfer | 455/188 |
| 4,577,171 | 3/1986 | Heigl et al. | 334/1 |
| 4,595,927 | 6/1986 | Menick | 343/390 |
| 4,654,884 | 3/1987 | Sakai et al. | 455/266 X |
| 4,710,973 | 12/1987 | Suzuki | 455/180 |
| 4,736,457 | 4/1988 | Kupfer | 455/188 |
| 4,792,991 | 12/1988 | Eness | 455/210 |
| 4,802,238 | 1/1989 | Fischer et al. | 455/188 |
| 4,893,349 | 1/1990 | Eastmond et al. | 455/205 |
| 4,998,289 | 3/1991 | Rabe et al. | 455/33 |
| 5,001,776 | 3/1991 | Clark | 455/226 |
| 5,012,490 | 4/1991 | Myer | 375/58 |

FOREIGN PATENT DOCUMENTS

| | | |
|---|---|---|
| 0369465 | 5/1990 | European Pat. Off. . |
| 0177030 | 8/1986 | Japan ........... 455/266 |
| 194423 | 8/1988 | Japan ........... 455/266 |
| 0194736 | 8/1990 | Japan . |

OTHER PUBLICATIONS

Lin et al., "Error Control Coding", Prentice Hall, 1983, pp. 315–322.
Collins Radio Company, "75A-3 Amateur-Band Receiver", Jun., 1953.
R. L. Drake Company, "Model 2-B Communication Receiver".
Hewlett-Packard Company, "8901A Modulation Analyzer", Mar., 1980.
Fisher, "A Subscriber Set for the Equipment Test", Bell System Technical Journal, vol. 58 No. 1, Jan., 1979, pp. 123–143.
Proakis, "Digital Communications", McGraw-Hill, 1983, pp. 570–579.
Bingham, "The Theory and Practice of Modem Design", John Wiley & Sons, 1988, pp. 237–251.
Electronic Industries Association, IS-54, "Cellular System Dual-Mode Mobile Station—Base Station Compatibility Standard", Dec., 1989, Sections 2.2.2.2.4–2.2.2.2.4.4.2, 2.4.5.4.1.1.1., 2.4.5.4.1.2.1.

*Primary Examiner*—Reinhard J. Eisenzopf
*Assistant Examiner*—Chi Pham
*Attorney, Agent, or Firm*—Raymond A. Jenski

[57] ABSTRACT

A radio receiver having a variable bandwidth received channel filter (113,115) to reduce interference is disclosed. A interference is detected by comparing received signal strength and received signal BER. The bandwidth of the filter (113,115) is narrowed to improve BER when a received signal strength is greater than a threshhold value and BER is worse than a threshold value.

5 Claims, 3 Drawing Sheets

INTERFERENCE REDUCTION USING AN ADAPTIVE RECEIVER FILTER, SIGNAL STRENGTH, AND BER SENSING

BACKGROUND OF THE INVENTION

The present invention is generally related to radio receivers and more particularly to a digital radio receiver having an adaptive bandwidth receive channel filter which is varied in order that interference, as determined by bit error rate and signal strength measurements, be minimized.

Radio receivers are inherently designed to receive signals from a desired signal source which transmits on one radio frequency and to reject signals from an undesired signal source which transmits on another radio frequency. One element which enables such discrimination between a desired signal and an undesired interfering signal is the receive channel filtering. In conventional receivers, a relatively narrow bandwidth bandpass filter is centered in frequency around the desired signal frequency (or the frequency to which the desired signal frequency is converted in a superheterodyne receiver) to pass the desired signal while rejecting signals on adjacent and other channels.

It has been a common practice in communications receiver design to provide a receiver channel filter or filters which are switchably variable in bandwidth and which may be variable in center frequency. The user of such a communications receiver can manually vary the receive channel filter bandwidth to accommodate the spectrum of signal to be received while avoiding interference from an adjacent channel. Additionally, users have been able to switch receiving bands in consumer receiver products and television receivers, thereby producing the selection of different filters or different filter bandwidths.

Commercial two-way transceivers (and some citizen's band transceivers) have employed in the receiver a noise reduction circuit, often called a noise blanker, which detects noise at a frequency separated from the frequency of the desired signal and briefly mutes the receiver during noise bursts. Such circuits, however, do not vary the received channel bandwidth and do not provide protection against adjacent channel interference.

Cellular radiotelephone transceivers employed by radiotelephone subscribers in analog cellular systems have adequate protection against adjacent channel interference provided by both the receive channel filter and a geographic channel allocation plan which places adjacent channels at a distance from each other. In some applications, radiotelephone service may be provided from two systems having different radio characteristics. U.S. Pat. No. 4,972,455 discusses such a radiotelephone. The digital cellular system proposed for use in the United States, employs a digital modulation which uses, on the average, a wider portion of the allocated 30 KHz channel bandwidth than the analog cellular modulation. This fuller channel occupation reduces the margin of protection from adjacent channel interference and in some cases results in objectionable interference being heard by the digital cellular radiotelephone user.

SUMMARY OF THE INVENTION

Accordingly, it is one object of the present invention to reduce the perceived adjacent channel interference in a digital receiver.

The present invention encompasses a radio receiver having a variable bandwidth received channel filter to pass a desired signal and reject an undesired signal. The radio receiver detects a predetermined amount of interference and adjusts the bandwidth of the variable bandwidth received channel selectivity filter.

DESCRIPTION OF A PREFERRED EMBODIMENT

Figure 1:
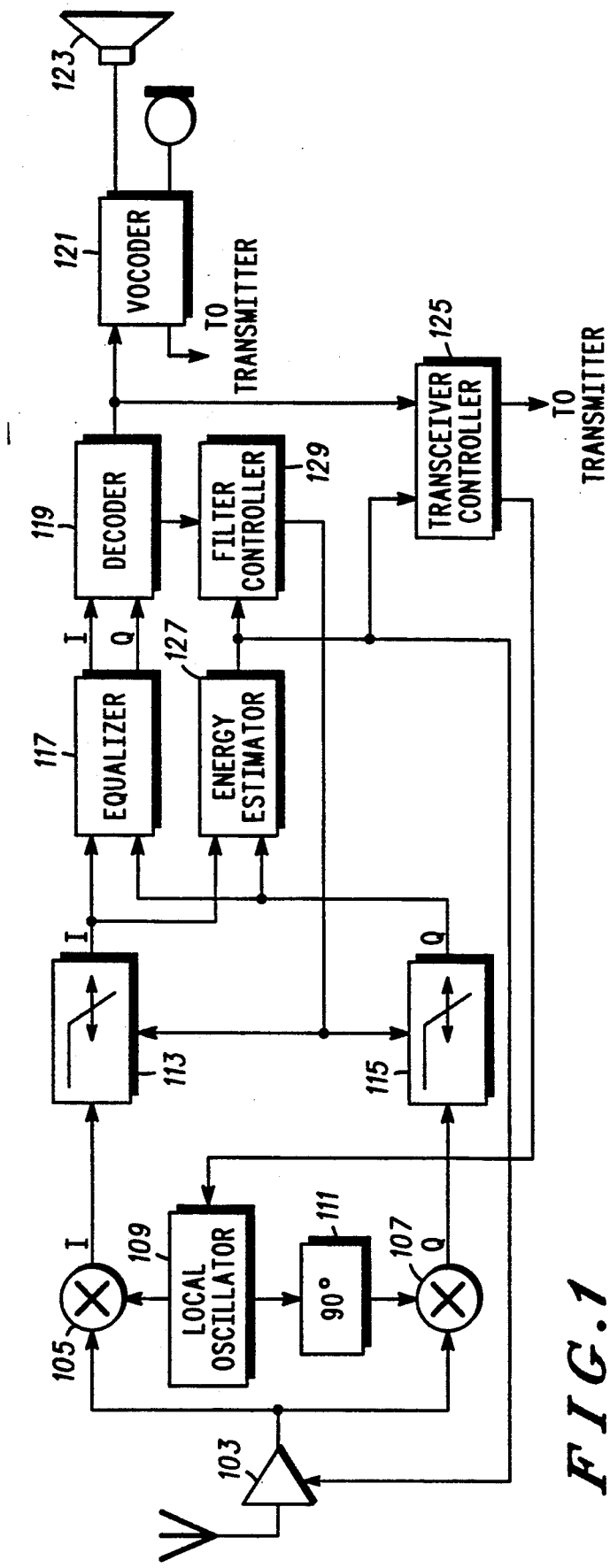
FIG. 1 is a block diagram of a digital radio receiver which may employ the present invention.

A digital receiver such as that which may be employed in a digital cellular radiotelephone network, is shown in the block diagram of FIG. 1. This radio receiver typically is designed to meet the specifications for the United States Digital Cellular Network as detailed in IS-54 "Dual-Mode Mobile Station-Base Station Compatibility Standard", Electronic Industries Association, Dec. 1989. In the receiver of FIG. 1, a measure of interference to a desired signal is available from the calculation of bit error rate (BER) of the received signal and a determination of the strength of the received signal. When the controlling functions of the radio receiver observes both a poor BER and a strong signal strength simultaneously, a conclusion may be drawn that the poor BER is a result of interference from an adjacent channel signal. Typically, a strong signal strength would be expected to yield a good BER in the absence of interference. In order to reduce the adjacent channel interference in the preferred embodiment, the filter or filters which provide the basic selectivity of the receiver (the "received channel filter") has its bandwidth narrowed so that interference from the adjacent channel, which is present at the edge of the filter passband, may be further rejected by narrowing the filter. In the absence of adjacent channel interference, narrowing the passband of the filter beyond its optimum would be expected to result in a degradation of the BER. Despite the BER degradation which occurs because the filter has been narrowed to less than optimum passband, an overall improvement is realized in the overall BER by the present invention since the interference is reduced. Once narrowed, the filter passband is periodically widened to determine whether the interference has disappeared. In the TDMA application of the United States Digital Cellular System, the filter passband widening is accomplished on a timeslot-by-timeslot basis and every Nth timeslot the wider filter is tested to see in which filter state BER is lowest. To provide a finer degree of control, the received channel filter may have several states of passband narrowness and the controller filter can select the passband yielding the optimum BER.

A radio signal which is received by the digital receiver of FIG. 1 is amplified by a conventional variable gain RF amplifier 103 and applied to conventional quadrature mixers 105 and 107. An in-phase mixing signal is generated by local oscillator 109 and a quadrature phase shifted signal generated by phase shifter 111 from the in-phase signal is applied to mixers 105 and 107, respectively, to produce quadrature signals I and Q from the received radio signal.

The I signal is applied to variable passband received channel filter 113 to obtain basic receiver selectivity to the I signal. Likewise, the Q signal output from mixer 107 is applied to variable passband received channel filter 115 to obtain basic receiver selectivity to the Q signal.

In the preferred embodiment, where the conversion of the received signal by mixers 105 and 107 is directly to baseband, received channel filters 113 and 115 are realized as lowpass variable passband filters having a seven pole, one zero response. A filter which may be employed as received channel filters 113 and 115 is illustrated in FIG. 2. The diagram illustrates an OTA filter in which each section (represented by section 201) is equivalent to an inductor of value $$L = \frac{C_S}{(gm)^2}.$$

Figure 2B:
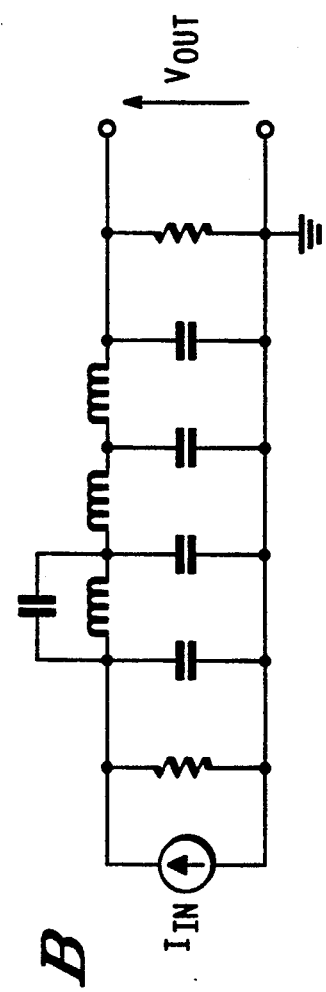
FIG. 2B is a schematic equivalent of the received channel filter of FIG. 2A.
Figure 2A:
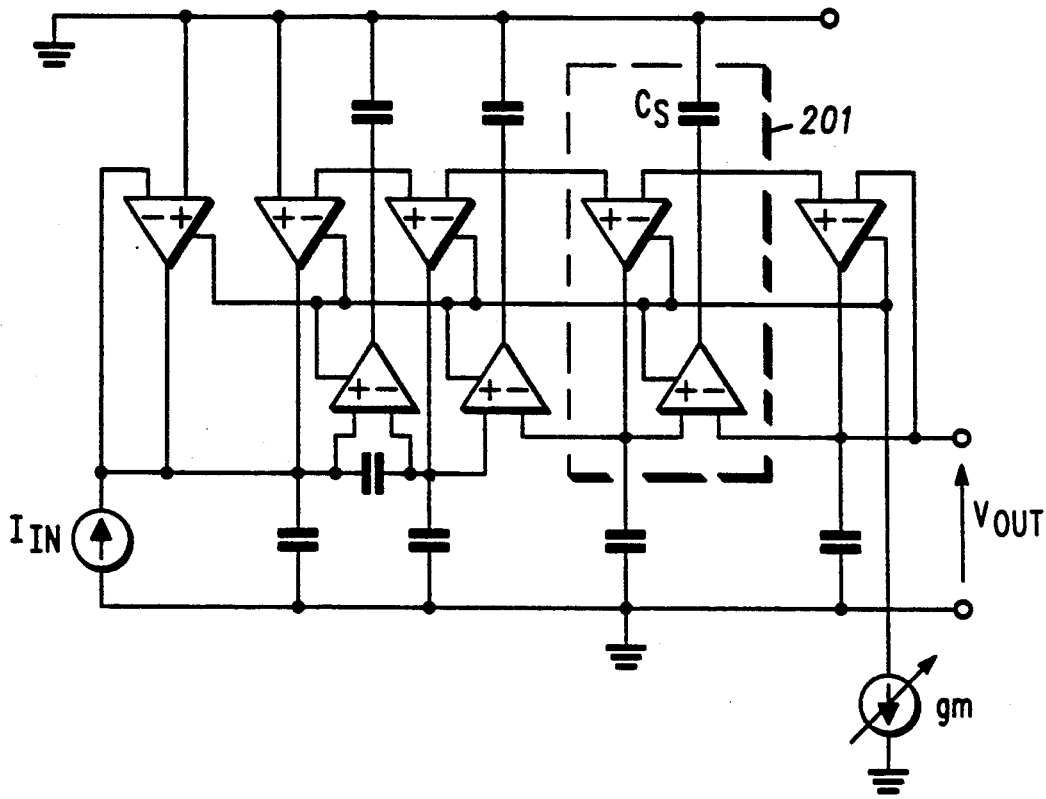
FIG. 2A is a block diagram of a variable bandwidth received channel filter which may be employed in the present invention.

The value of the inductor, therefore, may be varied by adjusting (gm) and the value of the inductance of all of the equivalent inductors may be varied by adjusting the bank (gm), as shown. The equivalent circuit of the OTA filter of FIG. 2A (at a selected inductance) is shown in FIG. 2B.

Figure 3:
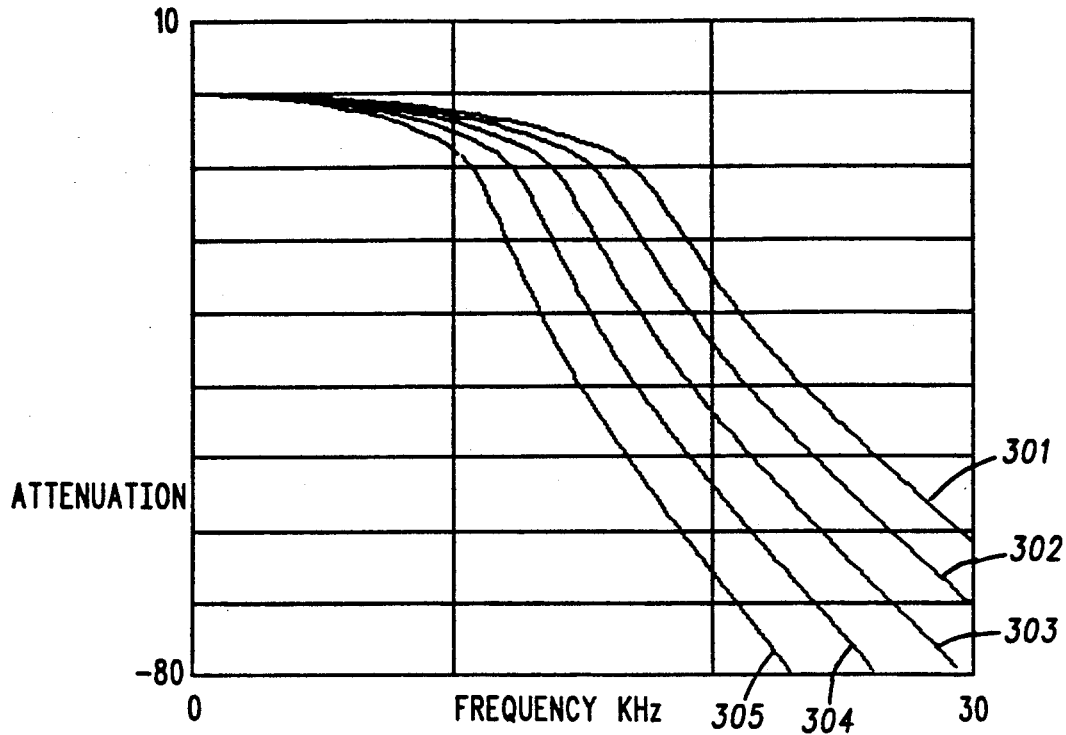
FIG. 3 is a graph of attenuation versus frequency for different bandwidths realized for the filter of FIG. 2.

The response of each of these filters is shown in the attenuation versus frequency response graph of FIG. 3. The optimized received channel filter passband is shown in curve 301, which has a 3 dB filter selectivity point at 11 KHz. Progressively narrower filter responses are shown for curves 302 through 305 where the 3 dB filter selectivity becomes 10 KHz, 9 KHz, 8 KHz and 7 KHZ,respectively. In the preferred embodiment, the received channel filter may be narrowed from the optimum frequency response of curve 301 to each of the other four filter responses depending upon a measured BER improvement or lack thereof.

Returning again to FIG. 1, the filtered I signal from received channel filter 113 and the filtered Q signal from received channel filter 115 are coupled to equalizer 117. The equalizer adaptively counteracts the distortion of the digital signals by the transmission medium of the radio channel. In the preferred embodiment, a maximum likelihood sequence estimation linear adaptive equalizer is employed. Basic information regarding such an equalizer may be found in "The Theory and Practice of Modem Design" by John Bingham, John Wiley and Sons, 1988, pages 237 through 252.

The corrected I and Q signals from equalizer 117 are coupled to the decoder 119. The operation of such a decoder is specified in IS-54" Dual-Mode Mobile Station-Base Station Compatibility Standard", Electronic Industries Association, Dec. 1989, paragraphs 2.2.2.2.4 et sec. In the preferred embodiment this decoder is realized using a Viterbi algorithm for a convolutional code which provides both a decoded data output having a largest path metric and an output of the "distance" of the path metric. Further description of a Viterbi algorithm decoder may be found in Lin et al., "Error Control Coding", Prentice-Hall, Inc, 1983, pp. 315-322. The distance is an expression of the bit error rate and is processed in the preferred embodiment in accordance with the aforementioned IS-54 Standard at Section 2.4.5.4.1.1.1.

The decoded data output from decoder 119 is coupled to conventional digital to analog vocoder 121 for conversion to an analog output which may be coupled to a conventional speaker 123. The output from decoder 119 is also coupled to conventional transceiver controller logic 125 so that command signals received by the receiver may be processed for transceiver operation.

Figure 4:
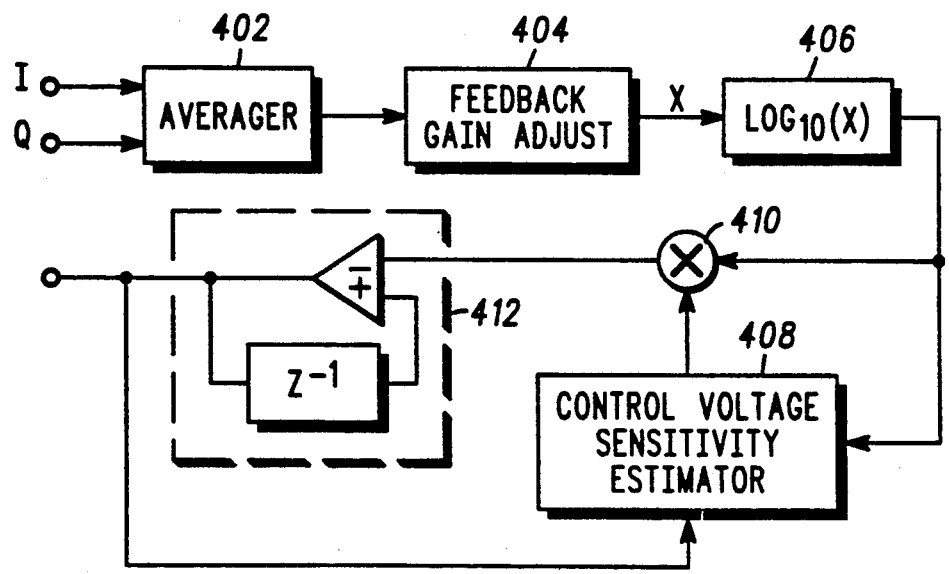
FIG. 4 is a block diagram of an energy estimator which may be employed in the present invention.

The filtered I signal from received channel filter 113 and the filtered Q signal from received channel filter 115 are also both coupled to energy estimator 127 (which, together with variable gain amplifier 103, forms an AGC circuit). A cellular radiotelephone transceiver in compliance with IS-54 must determine an estimate of the received signal strength and process it in accordance with Section 2.4.5.4.1.2.1. Referring to FIG. 4, I and Q signals are coupled to an averager 402 which calculates an average signal energy from addition of sample pairs of the squared amplitudes of I and Q. The averaged output is coupled to feedback gain adjust circuit 404 which adjusts the value to which $I^2$ and $Q^2$ are normalized. A logarithm (base 10) is conventionally taken (in 406) to produce a signal having logarithmic characteristics to match the exponential control function characteristics of variable gain amplifier 103. The output of $\log_{10}(x)$ calculator 406 is coupled to control voltage sensitivity estimator 408 and mixer 410. The output of mixer 410, which represents a control signal corrected for the slope characteristics of variable gain amplifier 103, is coupled to delay and compare function 412. The output of delay and compare function 412 is fed back to control voltage sensitivity estimator 408 to correct for errors in the estimate of control voltage slope of the variable gain amplifier 103, and is also output to the other functions of the receiver.

This output of the energy estimator 127 is provided as an automatic gain control (AGC) to RF amplifier 103, to the transceiver controller logic 125 for received signal strength indication purposes, and is applied to filter controller 129 for use in the determination of the presence of interference. The control voltage sensitivity estimator 408 and the energy estimator 127 are further described in U.S. patent application No. 5,083,304 "Automatic Gain Control Apparatus and Method", filed on the same date herewith in behalf of Cahill.

In the preferred embodiment, filter controller 129 is implemented as a digital signal processor (DSP) employing a DSP 56001 available from Motorola, Inc. and executing a series of preprogrammed steps to determine when adjacent channel interference is present. Filter controller 129 accepts the bit error rate (distance) from decoder 119 and the AGC signal strength output from energy estimator 127 to select from a range of receiver filter passbands to optimize BER when a poor BER and a strong signal strength are received simultaneously.

Figure 5:
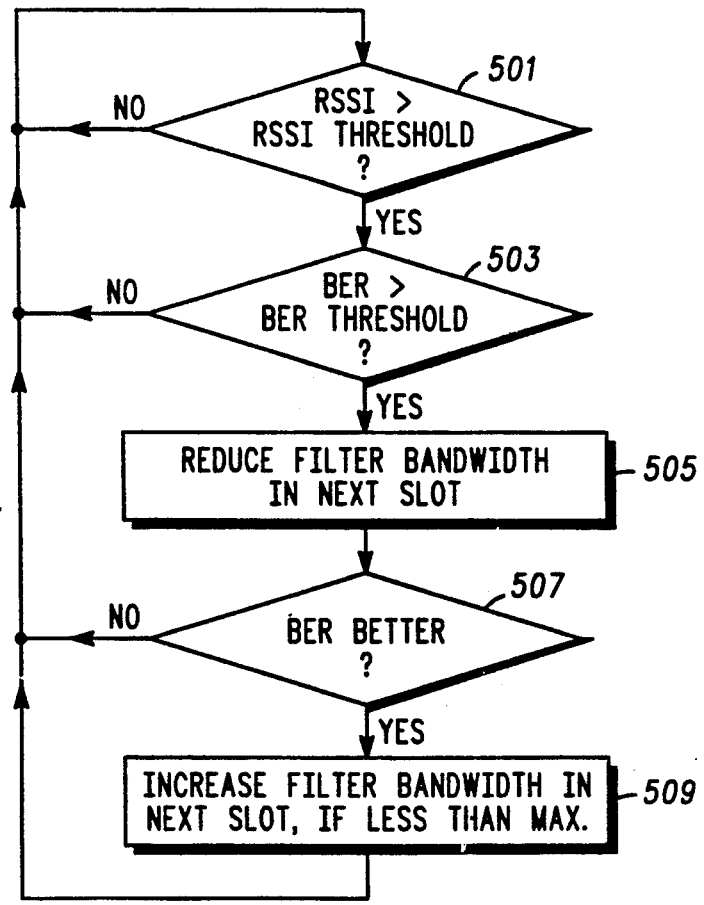
FIG. 5 is a flowchart describing a process of determining the presence of interference and varying the received channel filter which may be employed in the present invention.

The filter controller 129 executes the process shown in flowchart form in FIG. 5. The received signal strength indication (RSSI) from energy estimator 127 is compared to a RSSI threshold in step 501. In the preferred embodiment, the RSSI threshold is set at a level which corresponds to a signal strength yielding a signal to noise ratio of 24 db. If the RSSI does not exceed the RSSI threshold, in 501, the signal strength is not considered to be a "strong" signal and no further actions are taken in the process other than to continue a test of RSSI strength. If RSSI exceeds the RSSI threshold, a test is made, at 503, to determine if the bit error rate (BER) exceeds a BER threshold. In the preferred embodiment, the BER threshold is set at 1%. In the preferred embodiment, the measurement of BER is accomplished by testing the path metric output of the Viterbi decoder. If the BER does not exceed 1%, the error rate is not considered severe enough to warrant modification of the filter passband. The process then returns to measurement of RSSI. If the BER exceeds the BER threshold the passband of received channel filters 113 and 115 are reduced by one passband increment, at 505. At the next TDMA timeslot the BER is tested, at 507, and if the BER is better, the filter bandwidth is retained and the process returns to the RSSI measurement at 501. If the BER has not improved, at 507, received channel filters 113 and 115 are increased in filter bandwidth by one filter bandwidth increment for the next TDMA timeslot, at 509.

Thus, the audio quality of the received channel can be improved in the presence of adjacent channel interference by measuring interference and adjusting the receiver selectivity bandwidth for the net lowest BER.

What is claimed is:

1. A radio receiver having a variable bandwidth received channel filter to pass a desired signal having a plurality of time slots and reject an undesired signal, the radio receiver comprising:

means for producing a first signal having a value related to the signal strength of the desired signal received by the receiver;

means for determining a bit error rate of the desired signal during a first one of the plurality of time slots;

means for comparing said first signal value to a predetermined threshold value and for comparing said determined bit error rate to a predetermined bit error rate and for producing an output signal when said first signal value crosses said predetermined threshold value and said determined bit error rate exceeds said predetermined bit error rate; and means, responsive to said output signal, for adjusting the bandwidth of the variable bandwidth received channel selectivity filter for passage of a second one of the plurality of time slots.

2. A radio receiver in accordance with claim 1 wherein said means for adjusting the bandwidth of the variable bandwidth received channel selectivity filter further comprises means for reducing the bandwidth of the variable bandwidth received channel selectivity filter.

3. A radio receiver in accordance with claim 1 wherein the variable bandwidth received channel filter further comprises a variable bandwidth received channel filter having a plurality of discrete filter bandwidths.

4. A method of reducing adjacent channel interference in a radio receiver having a variable bandwidth received channel filter to pass a desired signal having a plurality of time slots and to reject an undesired signal, comprising the steps of:

producing a first signal having a value related to the signal strength of the desired signal received by the receiver;

determining a bit error rate of the desired signal during a first one of the plurality of time slots;

comparing said first signal value to a predetermined threshold value;

comparing said determined bit error rate to a predetermined bit error rate;

producing an output signal when said first signal value crosses said predetermined threshold value and said determined bit error rate exceeds said predetermined bit error rate; and adjusting the bandwidth of the variable bandwidth received channel selectivity filter for passage of a second one of the plurality of time slots in response to said output signal.

5. A method in accordance with the method of claim 4 wherein said step of adjusting the bandwidth of the variable bandwidth received channel selectivity filter further comprises the step of reducing the bandwidth of the variable bandwidth received channel selectivity filter.

* * * * *